United States Patent
Nania

[11] 3,915,098
[45] Oct. 28, 1975

[54] METHOD FOR THE MANUFACTURE OF A PALLET OF PLASTICS MATERIAL FOR STORING DIFFERENT MATERIALS OR PRODUCTS, DEVICE FOR CARRYING SAID METHOD INTO PRACTICE OBTAINED THEREBY

[76] Inventor: Benvenuto Nania, Via delle Sirene, 11 Marsala (Trapani), Italy

[22] Filed: July 12, 1972

[21] Appl. No.: 271,211

[30] Foreign Application Priority Data
July 17, 1971 Italy.................................. 26955/71

[52] U.S. Cl. ................................................. 108/51
[51] Int. Cl.² ......................................... B65D 19/32
[58] Field of Search ........... 108/51, 58; 52/737, 739

[56] References Cited
UNITED STATES PATENTS

| | | | |
|---|---|---|---|
| 2,893,588 | 7/1959 | Martin ........................... | 108/51 UX |
| 3,059,887 | 10/1962 | Ward .................................... | 108/51 |
| 3,251,322 | 5/1966 | Downs et al. .......................... | 108/58 |
| 3,378,985 | 4/1968 | Bugan .................................... | 52/739 |
| 3,464,371 | 9/1969 | Gifford ................................. | 108/57 |
| 3,509,832 | 5/1970 | Daisley ................................. | 108/51 |
| 3,520,258 | 7/1970 | Shepherd .......................... | 108/51 X |
| 3,603,273 | 9/1971 | Riffe ..................................... | 108/58 |
| 3,628,468 | 12/1971 | Angelbeck ............................ | 108/53 |
| 3,630,157 | 12/1971 | Ortenblad ............................ | 108/53 |
| 3,664,574 | 5/1972 | Kupersmit ............................ | 108/51 |
| 3,720,176 | 3/1973 | Munroe ................................ | 108/51 |

Primary Examiner—Richard E. Moore
Attorney, Agent, or Firm—Cushman, Darby & Cushman

[57] ABSTRACT

A disposable pallet and a manufacturing method therefor are described, in which the pallet comprises a single piece of expanded polystyrene, provided with resting feet extending from the bottom surface thereof, and a plurality of wooden slats, parallel to each other and embedded in said single piece of expanded polystyrene.

8 Claims, 7 Drawing Figures

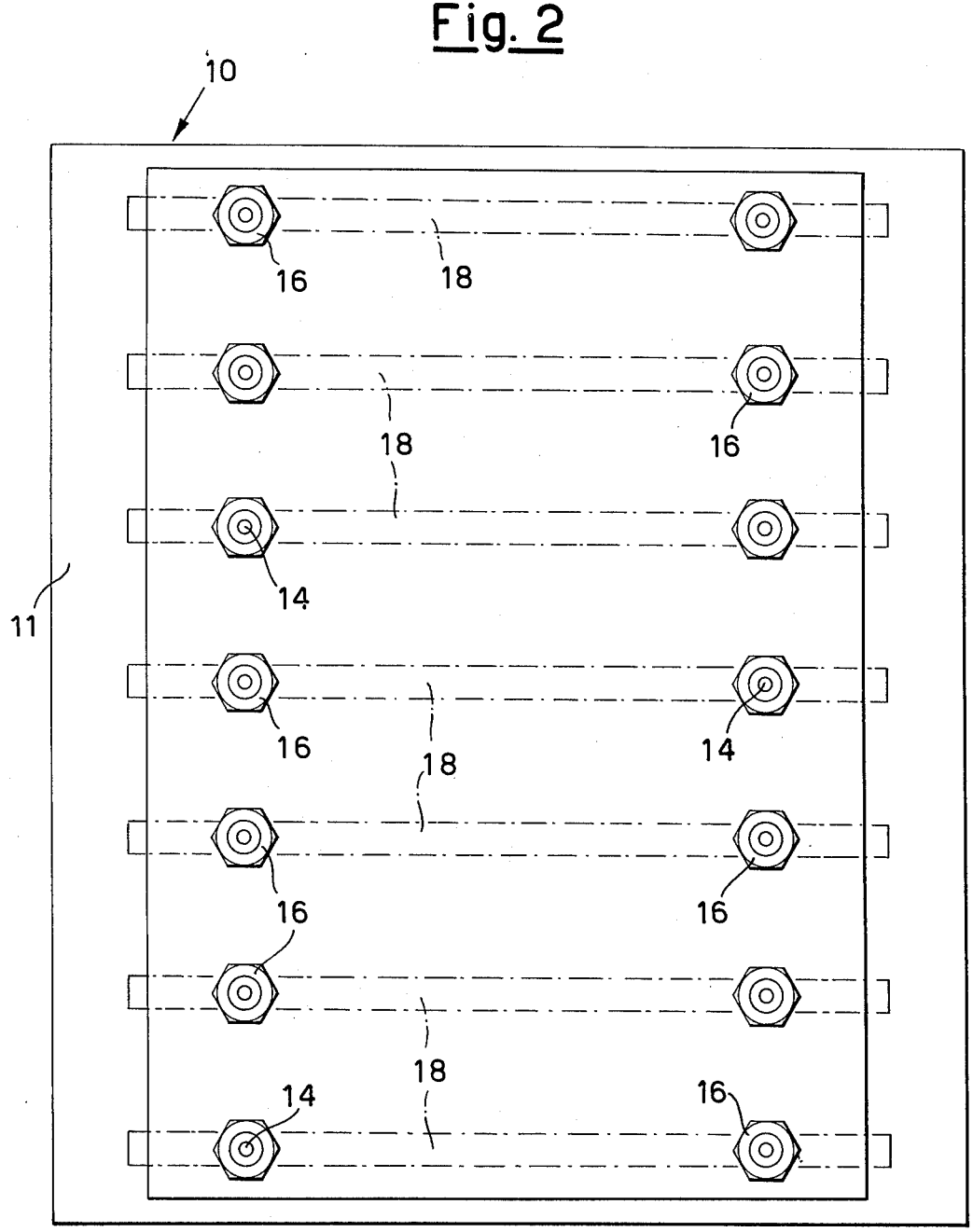

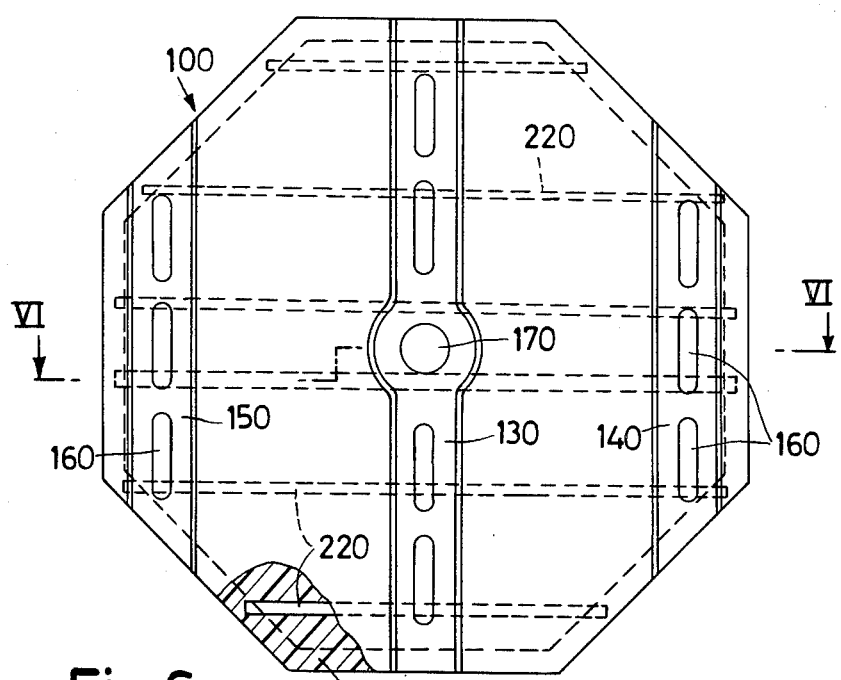
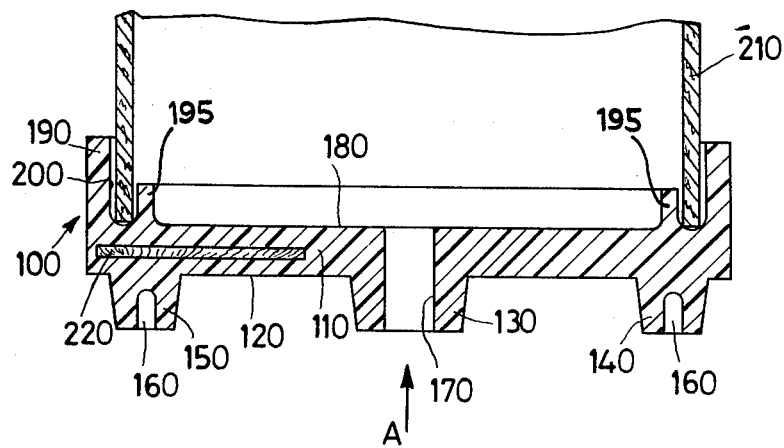

METHOD FOR THE MANUFACTURE OF A PALLET OF PLASTICS MATERIAL FOR STORING DIFFERENT MATERIALS OR PRODUCTS, DEVICE FOR CARRYING SAID METHOD INTO PRACTICE OBTAINED THEREBY

This invention relates to a method for the manufacture of a pallet or platform integrally formed of an expanded plastics material, as reinforced with wood slats embedded therein, for storing different products and/or materials: these platforms are more commonly called pallets.

Moreover, the invention relates to a device for putting said method into practice and to the product thus obtained.

As it is well known to those skilled in the art, the pallets for storing different products or materials are usually made of wood and generally comprise a flat of slats which rest on feet, which are so arranged as to be able to be grasped by a fork on two opposite sides thereof (so called two-way pallets), or on all the four sides ( so called four-way pallets).

These wooden pallets are of the disposable type and have the main defect that they are comparatively expensive, heavy and lend themselves poorly to storing certain products on account of the presence of nails and their proneness to absorb moisture.

In order to overcome these drawbacks, it has been suggested to adopt disposable pallets as formed as an integral piece of a plastics material.

Such disposable pallets as integrally formed by a plastics material have proved to have a resistance to the load which does not always measure up to the requirements.

According to the invention, it has been envisaged to reinforce the pallets with wooden slats as embedded in the plastics material.

This fact has originated the technical problem of how to support said wooden slats within the mould, while preventing that the supporting members thereof may subtract precious room to the expanded plastics material which is intended completely to wrap the slats in order to obtain a perfect cohesion therebetween.

This problem is solved, according to the invention, by driving a plurality of wooden slats onto a plurality of pins which extend vertically from the walls of a mould, the latter reproducing the desired shape for the pallets, then feeding the mould with pre-expanded and ripened plastics material while simultaneously feeding in steam, then cooling and allowing the moulded piece to ripen.

In order that a high load resistance may be achieved the wooden slats are positioned parallel to each other and perpendicularly to the resting feet of the pallet.

In addition, the slats have a sawtooth outline so as to exalt their adhesion with the expanded plastics material and, preferably, they are obtained from a comparatively flexible wood, such as fir, so as to match the bending motion of the expanded plastics material under the load, thus preventing internal failures therein.

The foregoing and other features and advantages of the invention will become more clearly apparent from a scrutiny of the ensuing exemplary disclosure which is given with reference to the accompanying drawings, the latter showing a mould constructed according to the subject invention, and made according thereto and another pallet made according to the invention.

IN THE DRAWINGS

FIG. 2 is a plan view of the mould shown in FIG. 1.

FIG. 6 is a cross sectional view taken along the line VI—VI of FIG. 7 and showing another pallet made according to the invention, and FIG. 7 is a plan view taken along the arrow A of FIG. 6.

Figure 1:
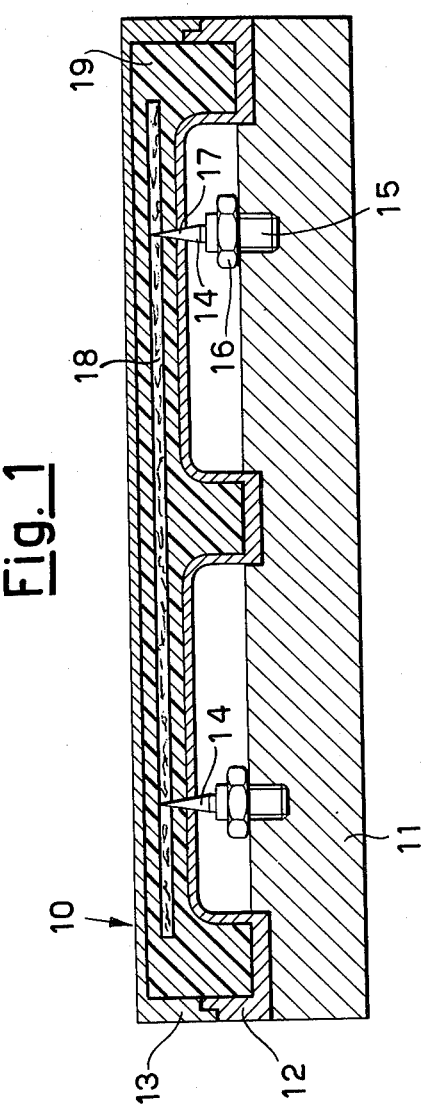
FIG. 1 is a cross-sectional view showing the mould.

With particular reference to FIGS. 1 and 2 of the drawings, the numeral 10 generally indicates the mould in question, which is structurally composed by a bedplate 11, a die 12 and a counterdie 13. The bedplate 11, the die 12 and the counterdie 13 are so connected to one another as to be easily removable. Characteristically, there extend from the bedplate 11, vertically and perpendicularly therefrom, a plurality of slender pointed pins 14 evenly spaced apart from each other along two confrontingly arranged parallel rows (FIG. 2).

As clearly shown in FIG. 1, said pins 14 have, each, a screw-threaded shank 15 and a nut 16 for being affixed to the bedplate 11 and extend with their points into the interior of the die and counterdie assembly, as they pass through holes 17 forward in the die 12.

Figure 5:
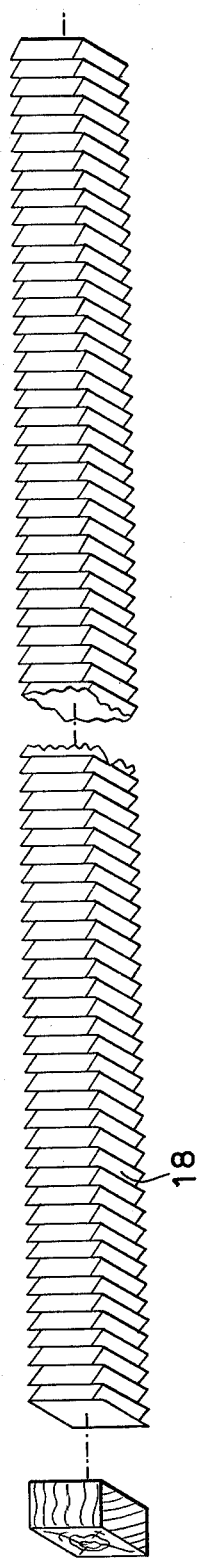
FIG. 5 is a closeup view showing a perspective view of one of the reinforcing slats of the pallet.

Said pointed ends are intended to receive wooden slats 18 driven thereon (FIGS. 2 and 5) having a sawtooth profile so as to increase their adhesion to the expanded plastics material, the slat being preferably made of firwood.

In the so constructed mould, after that the slats have been driven onto the pointed ends of the pins 14, the interior of the die and counterdie assembly (which of course reproduces the shape of the pallet one desires to obtain) is conventionally fed with a ripened and pre-expanded plastic material 19, preferably expanded polystyrene, and simultaneously with steam: the moulded article is then cooled and allowed to ripen.

Figure 3:
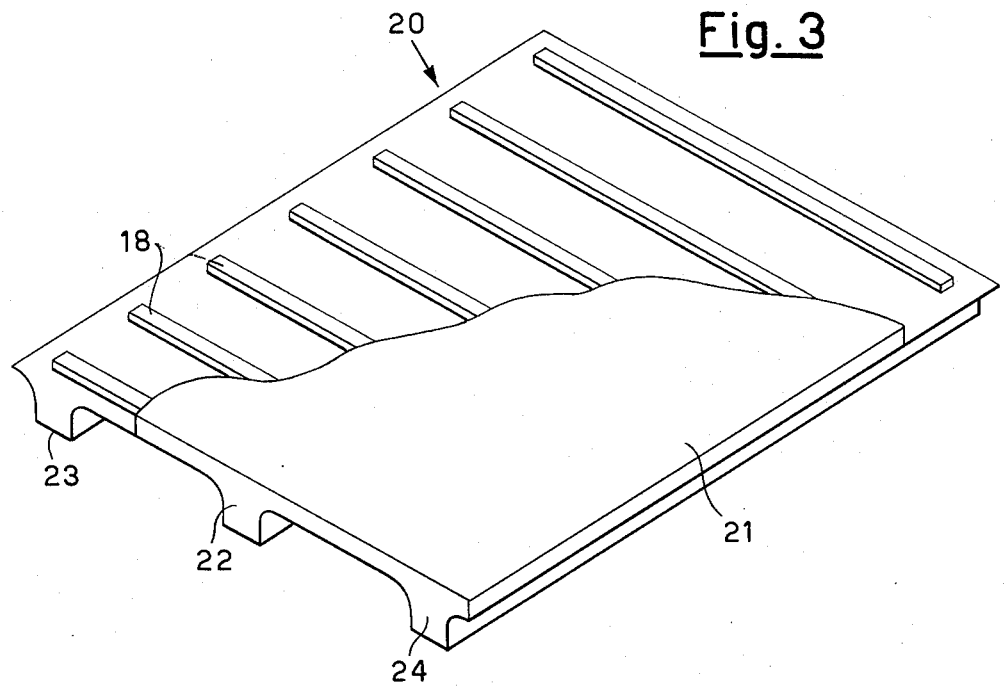
FIG. 3 is a top perspective view showing the pallet as obtained from the mould of FIGS. 1 and 2.
Figure 4:
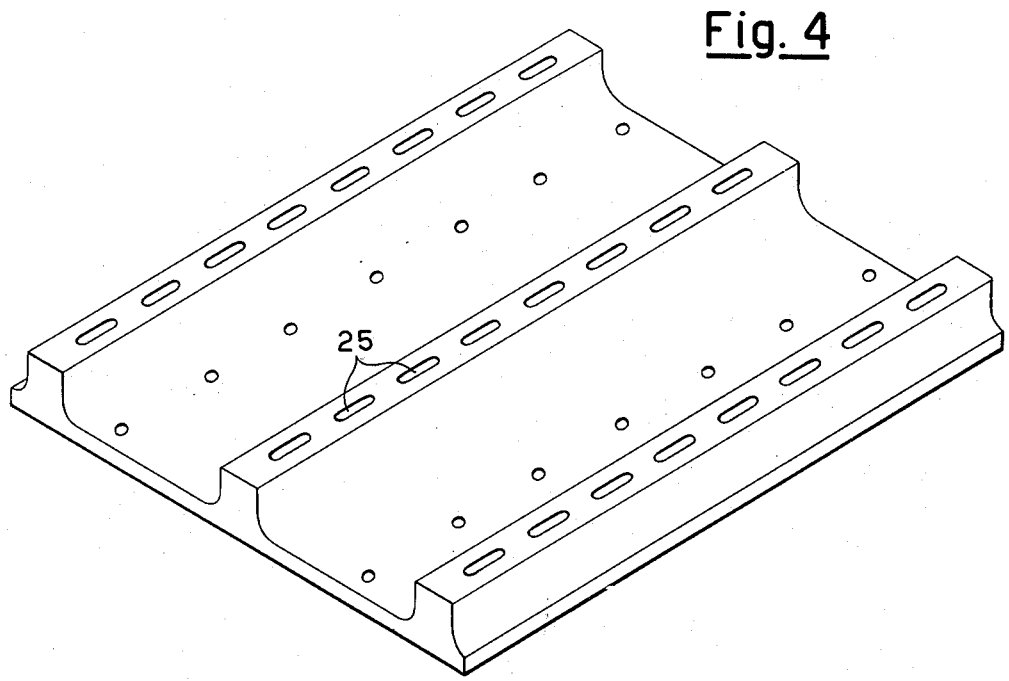
FIG. 4 is a perspective view of the pallet of FIG. 3, shown turned upside down.

FIGS. 3 and 4 illustrate the pallet thus obtained: it is generally indicated at 20 and is composed by a planar resting surface 21 for the merchandise, and from the bottom face of the pallet three supporting feet 22, 23 and 24, parallel to each other, extend. The foot 22 extends along the centre line of the pallet, while the feet 23 and 24 are extended along two opposite sides of the pallet. The feet have lightening hollows 25 (FIG. 4). It will be noted that the wooden slats 18 are parallel to each other and are perpendicular to the resting feet so as considerably to strengthen the pallet.

Of course, the mould 10 could also have a shape which is adapted to originate four-way pallets or pallets of any different shape without changing anything, from a conceptual standpoint.

FIGS. 6 and 7 show another pallet made according to the invention.

Said pallet is adapted to receive containers and is generally indicated at 100 and is also made as a single piece of expanded polystyrene.

The pallet 100 has a octagonal flat 110 from whose bottom surface there extend three resting feet 130, 140 and 150, parallel to each other. The foot 130 is extended along the centre line of the pallet, whereas the feet 140 and 150 are extended along two opposite sides of the pallet. The feet 130, 140 and 150 are tapered towards the bottom and have lightening hollows 160.

The foot 130 in addition has a central hole 170 which passes therethrough and through the flat 110, for discharging the merchandise. The hole 170 of course is intended to be stoppered by a plug, not shown.

From the top face 180 of the flat 110, a peripheral inner edge 190 and outer edge 195 form a groove as shown at 200, the groove being intended to receive in a freely removable manner a container as diagrammatically shown at 210.

A pallet so constructed is preferably, but not compulsorily, intended to receive octagonal paperboard containers which, as compared with the conventional rectangular containers, are more robust since they have a double number of edges. According to the invention, in the flat 110 there are embedded wooden slats 220 which are parallel to each other and are perpendicular to the resting feet 130, 140 and 150 so as to reinforce the pallet structure. These wooden slats are shaped in the same way as described for the embodiment first described herein.

The advantages of the invention can be summarized as follows :

The adhesion of the pointed pins 14 brilliantly solves the problem of supporting the wooden slats in the mould without subtracting space to the expanded resin, but to a minimum extent ;

a price reduction up to 50% as compared with that of a wooden pallet of the same size and performance;

absolute absence of nails which could be detrimental for storing certain products or materials;

a perfectly continuous and smooth surface for the flat (wooden pallets are constructed with a wooden frame which creates detrimental empty spaces, obnoxious for certain uses);

since the pallets are perfectly insulated they can be put also on moist or swampy grounds without any danger for the material, for example when storing perishable products or materials such as sugar, starch and others ;

a pallet made according to the invention, the size being equal, is considerably more lightweight than a wooden pallet and can thus be handled more conveniently and can be shipped with a reduced toil and expense;

it is virtually shock resistant : as a matter of fact the use of a fork truck usually produces in the pallet a more or less wide hole without, however, prejudicing the use of the pallet, whereas a shock between a fork truck and a wooden pallet may rupture slats in it and prejudice the use ;

it is perfectly acceptable from a hygienic standpoint;

absolute absence of nails which could cause damages when storing certain products and materials.

What I claim is:

1. A pallet formed as a single flat body of expanded foamed polystyrene having feet projecting downwardly from the lower surface of the body, wherein a plurality of flexible wooden slats are embedded in the interior of said body and are adhered to said expanded foamed polystyrene substantially intermediate of the upper and lower surfaces thereof, said flexible wooden slats matching the bending of said expanded foamed polystyrene under an applied load, said slats also being parallel to each other and disposed perpendicularly to the feet, said lower surface having apertures formed by pins provided to support said flexible wooden slats intermediate of said surfaces during a pallet forming molding process.

2. A pallet as in claim 1 wherein said flexible wooden slats have a saw-toothed profile.

3. A pallet as in claim 1 in which the upper surface of the body is provided with upwardly depending inner and outer peripheral edges, said outer edge extending upwardly a greater distance than said inner edge, said edges thereby providing a groove which extends around the periphery of the body for receiving the side wall of a container.

4. A pallet as in claim 2 wherein the body has a central hole extending through the upper and lower surfaces of the body for discharging pourable material from a container supported on the body.

5. A pallet as in claim 2 wherein the body is octagonal.

6. A pallet as in claim 1 wherein there are three feet in the form of spaced apart parallel ribs, one foot being centrally located on the body and extending along the center line of the body, and two feet being laterally located extending along two opposite sides of the body.

7. A pallet as in claim 6 wherein the upper surface of the body is provided with upwardly depending inner and outer peripheral edges, said outer edge extending upwardly a greater distance than said inner edge, said edges thereby providing a groove which extends around the periphery of the body for receiving the side wall of a container and wherein the body has a central hole extending from the upper surface of the body through the centrally located foot for discharging pourable material from a container located on the body.

8. A pallet as in claim 1 wherein the feet have hollow spaces therein to reduce the weight of the pallet.

* * * * *